United States Patent [19]

Redl

[11] 4,367,889
[45] Jan. 11, 1983

[54] FIRE GUARDED BLOWOUT PREVENTER HOSE

[76] Inventor: Philip J. Redl, Sherwood Park, Canada

[21] Appl. No.: 221,474

[22] Filed: Dec. 30, 1980

Related U.S. Application Data

[63] Continuation-in-part of Ser. No. 44,735, Jun. 1, 1979, abandoned.

[30] Foreign Application Priority Data

Dec. 28, 1978 [CA] Canada ................................. 318706

[51] Int. Cl.³ ............................................ F16L 39/02
[52] U.S. Cl. .................................... 285/149; 138/127; 285/256
[58] Field of Search ................ 285/149, 256; 138/127, 138/109

[56] References Cited

U.S. PATENT DOCUMENTS

| | | |
|---|---|---|
| 1,314,333 | 8/1919 | Kahn . |
| 2,341,003 | 2/1944 | Watson ................................ 285/256 |
| 3,251,612 | 5/1966 | Webbe ............................ 285/256 X |
| 3,529,853 | 9/1970 | Triest et al. ......................... 285/149 |
| 4,190,088 | 2/1980 | Lalikos et al. .................. 285/149 X |
| 4,275,769 | 6/1981 | Cooke ................................. 285/149 |

FOREIGN PATENT DOCUMENTS

| | | |
|---|---|---|
| 1495499 | 8/1967 | France ................................ 285/256 |
| 586140 | 3/1947 | United Kingdom ................ 285/256 |

*Primary Examiner*—Thomas F. Callaghan
*Attorney, Agent, or Firm*—Beveridge, DeGrandi & Kline

[57] ABSTRACT

Fireproof blowout preventer hose for oil well drilling rigs has a layer of fireproof material provided over the coupling in the hose and retained therein by non-combustible rigid outer shell.

7 Claims, 1 Drawing Figure

U.S. Patent    Jan. 11, 1983    4,367,889
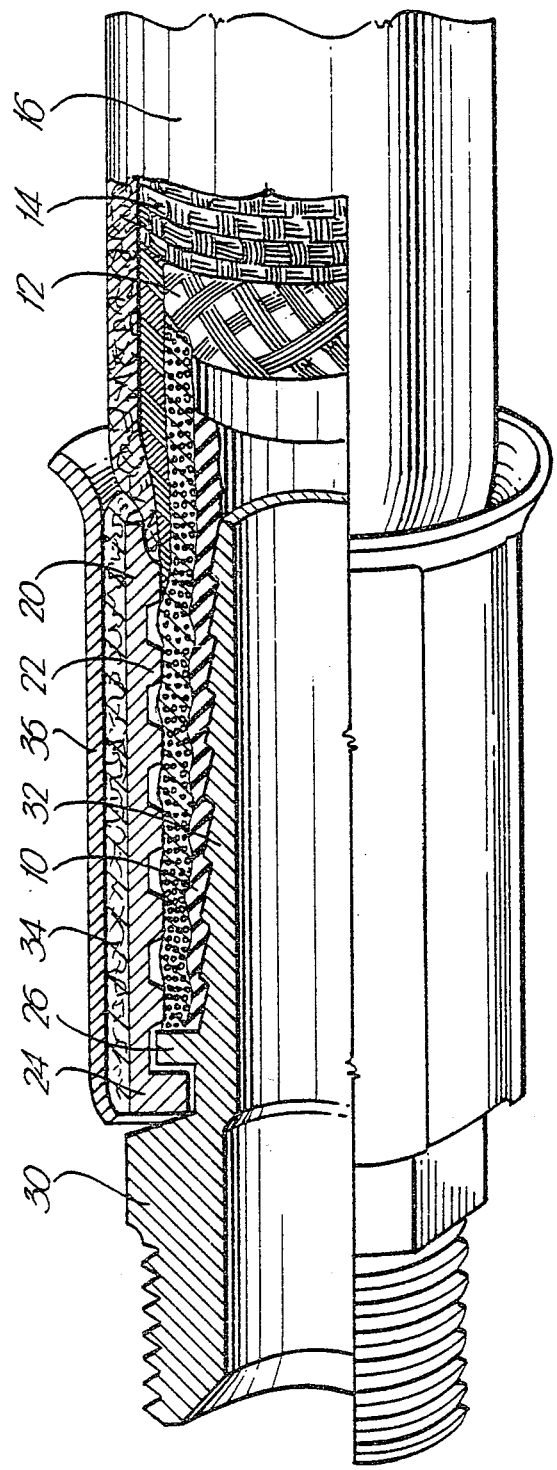

FIRE GUARDED BLOWOUT PREVENTER HOSE

This application is a continuation-in-part of Ser. No. 44,735, filed June 1, 1979, now abandoned.

This invention relates to fireproof hosing and in particular to hoses which are designed for the higher operating pressure in hydraulically actuated blowout preventer assemblies. Such hoses connect an hydraulic pressure system under or outside an oil or gas-well drilling rig sub-structure with a blowout preventer closing unit or valve. The valve is located at the head of the well, and can be closed to shut off the escape of gas or oil from the well.

Prior art hoses have included coupling assemblies at their ends, which assemblies have quickly absorbed the considerable heat resulting from exposure to oil or gas fires. The resulting elevated temperatures of the coupling assemblies have frequently resulted in the deterioration and failure of the connection between the coupling assemblies and hose.

As the hoses are intended for transmission of hydraulic fluids to actuate closure of the wellhead control valve or blowout preventer valve of a gas or oil well rig during a fire or other dangerous situation, the failure of these hoses has resulted in the valve assembly remaining open and the consequential continued escape of the flammable fluids into the fire.

The hose of the present invention is manufactured with sufficient layers of fire resistant fabric to withstand the most extreme heat of an oil or natural gas fire resulting from a blowout at the main wellhead control valve or blowout preventer valve. Under such conditions, the hose is required for hydraulic operation of the valve for a minimum period of about twenty minutes.

According to a broad aspect, the invention relates to a fireproof blowout preventer hose for oil well drilling rigs, and comprises an inner tube for conducting hydraulic fluid, said inner tube having a covering of:

(a) at least one layer of high tensile material;
(b) a moisture-proof bonding layer covering the high tensile material;
(c) a layer of fireproof material;
(d) an exterior cover layer;

and a coupling comprising cooperating inner and outer coaxial members adapted to retain at least the inner tube and the tensile layer therebetween, the outer member of the coupling being enveloped by a layer of fire-resistant insulating material retained by a non-combustible impact resistant shell.

The invention is illustrated by way of example in the accompanying drawing which is a partially sectioned perspective view of the present invention.

Referring to the drawing, the hose comprises an inner tube 10 which can be manufactured from a material such as plastic or synthetic rubber compatible with hydraulic fluids, and is frequently manufactured from a high quality Buna N for the transmission of hydraulic fluids under pressure. The inner tube 10 is provided with a covering 12 of at least one layer and preferably two or more layers of wire which may be in the form of braided or spiral wound high tension wire. The wire layer 12 is in turn covered by a heavy layer 14 of fireproof fabric. This fabric may be synthetic glass cloth, tightly woven asbestos fireproof woven fabric or other suitable fire resistant material. Layer 14 provides a moisture-proof covering over the high tensile wire. Optionally, a bond or skim coating of suitable moisture-proof bonding material may be applied to wire layer 12 prior to application of the fire resistant layer 14. Lastly an outer layer 16 of moisture, abrasion and heat resistant material is provided, such as Neoprene or a similar compound.

The hose is also provided with a coupling comprising a crimp or wedge collar 20 having a plurality of annular teeth 22 which engage the surface of the wire layer 12. The outer terminal end of the wedge collar 20 is provided with an inner radial rim 24 for interlocking engagement with the shoulder 26 of nipple or insert 30, which is coaxially positioned in the tube 10. It will be seen from the drawing that the outer surface of the nipple is provided with ribs 32 which co-operate with wedge teeth 22 to engage the layers of the hose 10 and 12.

A layer 34 of fireproof insulating material such as asbestos or high temperature resin is provided over the outer surface of the wedge 20, and this layer 34 is in turn covered by a retainer 36 of abrasion resistant non-combustible material. It is desirable that the retainer be of sufficient dimension to retain and protect the fireproof material layer 34. Where the shell 36 is a suitable metal, such as steel, it is desirable to avoid contact between shell 36 and nipple 30, thereby avoiding conduction of heat from the shell to the nipple.

The combination of fireproof material 34 and shell 36 over the connection of the hose, wedge 20 and nipple 30 provides a fireproof coupling.

The coupling in accordance with the present invention has been fire tested under internal hydraulic pressure of 2000 pounds with a flame of 2200 degrees Farenheit applied to both the coupling and hose body for 35 minutes without failure.

I claim:

1. A fireproof blowout preventer hose for oil well drilling rigs, comprising an inner tube suitable for conducting hydraulic fluid, said inner tube having a covering of:

(a) at least one layer of high tensile material;
(b) a moisture-proof bonding layer covering the high tensile material;
(c) a layer of fireproof material;
(d) an exterior cover layer;

and a coupling comprising cooperating inner and outer coaxial members adapted to retain at least the inner tube and the tensile layer therebetween, the outer member of the coupling being enveloped by a layer of fire-resistant insulating material retained by a non-combustible impact resistant shell.

2. A hose as defined in claim 1, wherein the shell does not directly contact either the inner or outer coaxial members.

3. A hose as defined in claim 2 wherein the outer coaxial member of the coupling is crimped over the inner member and the interposed layers.

4. A hose as defined in claims 1, 2 or 3 wherein the inner surface of the outer coaxial member displays transverse annular teeth and the outer surface of the inner coaxial member displays transverse annular ribs, wherein the said teeth and ribs mutually engage the interposed layers.

5. A hose as defined in claims 1, 2 or 3 wherein a metal shell retains a layer of asbestos material or compound.

6. A hose as defined in claims, 1, 2 or 3 wherein the tensile layer comprises spiral wound wire or wire braid.

7. A fireproof blowout preventer hose for oil well drilling rigs, comprises an inner tube for conducting hydraulic fluids, said inner tube having a covering of:
 (a) at least one layer of high tensile wire;
 (b) a moisture-proof and bonding layer covering said high tensile wire;
 (c) a layer of tight woven asbestos tubing; and
 (d) a fire-resistant covering over said asbestos tubing; and a coupling comprising a wedge collar inserted on the end of the hose over the wire layer and the terminal end of the moisture-proof covering, said wedge collar interlocking with a nipple coaxially positioned in the end of said inner tube, and an outer shell comprising a layer of asbestos over said wedge and a steel retainer over said layer of asbestos, the outer terminal end of the steel retainer being spaced from said nipple to inhibit heat transfer thereto from said retainer.

* * * * *